No. 653,074. Patented July 3, 1900.
L. D. DRAPER.
STUD FOR GARMENT SUPPORTERS.
(Application filed Jan. 29, 1900.)

(No Model.)

Witnesses:
Arthur D. Randall
Hausten Browne Maynadier

Inventor:
Lucius Dana Draper,
by J. E. Maynadier
Attorney.

UNITED STATES PATENT OFFICE.

LUCIUS DANA DRAPER, OF BOSTON, MASSACHUSETTS, ASSIGNOR OF FOUR-NINTHS TO EDWARD W. PHILLIPS, OF SAME PLACE.

STUD FOR GARMENT-SUPPORTERS.

SPECIFICATION forming part of Letters Patent No. 653,074, dated July 3, 1900.

Application filed January 29, 1900. Serial No. 3,089. (No model.)

*To all whom it may concern:*

Be it known that I, LUCIUS DANA DRAPER, of Boston, in the county of Suffolk and State of Massachusetts, have invented a new and useful Stud for Garment-Supporters, of which the following is a description, reference being had to the accompanying drawings, in which—

Figure 1:
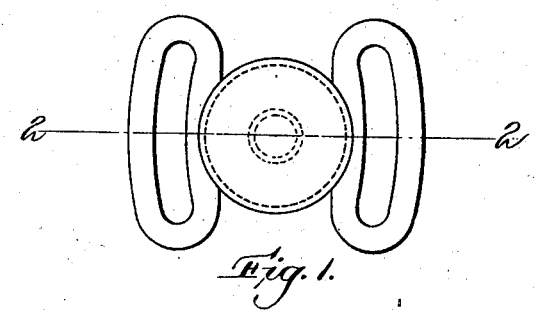
Figure 2:
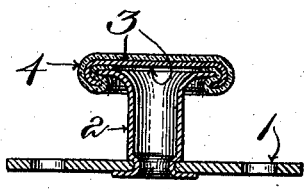
Figure 4:
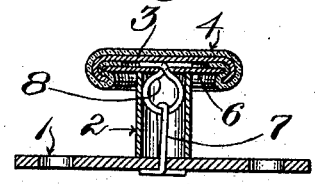
Figure 3:
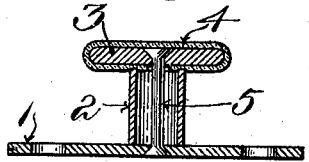

Figure 1 is a plan of one of my new studs. Fig. 2 is a section on line 2 2 of Fig. 1. Figs. 3 and 4 are sectional views showing modifications of my invention.

The drawings are enlarged and the parts are shown conventionally for clearness.

Heretofore studs of this class have been made of a slotted base-plate and a metal shank with a disk of metal forming a head on its outer end, secured at its inner end to the plate after passing through one or more washers, of rubber, felt, or other soft material, the head on that stud thereby holding the soft material to the plate, with the metal head protruding slightly beyond the soft material, but the shank and under part of the head being otherwise wholly covered by the soft material. For example, see Patents No. 603,517, dated May 3, 1898, and No. 608,487, dated August 2, 1898, to Charles W. Stimson, and No. 552,470, dated December 31, 1895, to Robert Gorton. My stud is composed of a slotted base-plate and a metal shank secured at its inner end to the base-plate and having at its outer end a head-plate which extends across the outer end of the shank and whose top surface and edge and part of whose under surface are covered with cloth, rubber, or other soft sheet material secured to the head-plate at the upper end of the shank.

In supporter-studs as heretofore made great care was necessary to smooth the upper surface and edge of the metal head which held the soft material to the base, through the metal shank fast at one end to the base and at its other end to the metal head, for any roughness of any exposed part of this metal head frayed the stocking, and, moreover, the edge of the felt or rubber disk was soft and yielding.

The object of my invention is to wholly cover those portions of the metal head-plate which if not so covered would come into contact with the stocking and also to reinforce and stiffen the edge of the disk of soft and yielding material by the metal head-plate.

In the drawings, Figs. 1 and 2, the upper flaring edge of the hollow shank 2 clamps the inturned edge of the soft sheet material 4 to head-plate 3, and the inner end of shank 2 projects through base-plate 1 and is headed over upon the under side of plate 1, so that the upper surface of the head-plate 3, its edge, and part of its under surface are covered by a sheet 4 of soft material—such as cloth, rubber, or the like—fastened in place at the junction of shank 2 and head-plate 3.

In Fig. 3 I have shown a modified form of my invention wherein the shank 2 is cylindrical and a rivet 5 holds the head-plate 3 in place on shank 2 and shank 2 in place on base-plate 1, and the edge of the sheet 4 of soft material is clamped between head-plate 3 and the outer end of shank 2.

In Fig. 4 I have shown another form of my invention wherein the shank is made up of two parts and the edge of the sheet 4 of soft material is clamped between head-plate 3 and part 6 of the shank, which is fast to the outer end of part 2, and end part 6 is held in place on the end of part 2 by a wire 7, fast at its ends to base-plate 1, and the loop of which engages an eye 8, fast to part 6.

What I claim as my invention is—

A stud for garment-supporters comprising a base-plate; a metal shank; a metal head-plate which extends across the outer end of the shank; and a sheet of soft material covering the top surface and edge of the head-plate, and with its edge turned in under the head-plate and clamped between the head-plate and the end of the shank, substantially as described.

LUCIUS DANA DRAPER.

Witnesses:
WM. MAYNADIER,
ARTHUR F. RANDALL.